United States Patent [19]

Hazard

[11] Patent Number: 4,907,270
[45] Date of Patent: Mar. 6, 1990

[54] METHOD FOR CERTIFYING THE AUTHENTICITY OF A DATUM EXCHANGED BETWEEN TWO DEVICES CONNECTED LOCALLY OR REMOTELY BY A TRANSMISSION LINE

[75] Inventor: Michel Hazard, Mareil/Mauldre, France

[73] Assignee: Bull CP8, Trappes, France

[21] Appl. No.: 171,427

[22] PCT Filed: Jul. 9, 1987

[86] PCT No.: PCT/FR87/00271
§ 371 Date: March 10, 1988
§ 102(e) Date: March 10, 1988

[87] PCT Pub. No.: WO88/00742
PCT Pub. Date: Jan. 28, 1988

[30] Foreign Application Priority Data

Jul. 11, 1986 [FR] France .................. 86 10206

[51] Int. Cl.⁴ .............................................. H04L 9/00
[52] U.S. Cl. ........................................ 380/23; 380/24; 380/25
[58] Field of Search ................. 380/23, 24, 25, 46

[56] References Cited
U.S. PATENT DOCUMENTS 4,204,113 3/1980 Giraud et al. ............... 380/23
4,211,919 7/1980 Ugon ............................ 380/23
4,471,216 9/1984 Herve ........................... 380/23
4,638,120 1/1987 Herve ........................... 380/23
4,649,233 3/1987 Bass et al. .................... 380/25
4,683,553 7/1987 Mollier ......................... 380/25
4,691,355 9/1987 Wirstrom et al. ............. 380/23
4,731,841 3/1988 Rosen et al. .................. 380/23
4,802,218 1/1989 Wright et al. ................ 380/23
4,811,393 3/1989 Hazard ......................... 380/23

Primary Examiner—Salvatore Cangialosi
Attorney, Agent, or Firm—Kerkam, Stowell, Kondracki & Clarke

[57] ABSTRACT

The subject of the invention is a method for certifying the authenticity of a datum exchanged between two devices connected locally or at long distance by a transmission line.

The transmitting device (2) fashions an enciphered message (M) on the basis of a parameter (X) at least one field (X1) of which must satisfy a predetermined condition and one field (X3) corresponds to the datum (d) to be transmitted. The receiving device (1) deciphers the message (M) in order to find a parameter (X') the field (X'1) of which must satisfy the same condition as the field (X1) for which the field (X'3) corresponds to the datum (d) transmitted.

The invention is applicable in particular to credit cards.

6 Claims, 1 Drawing Sheet

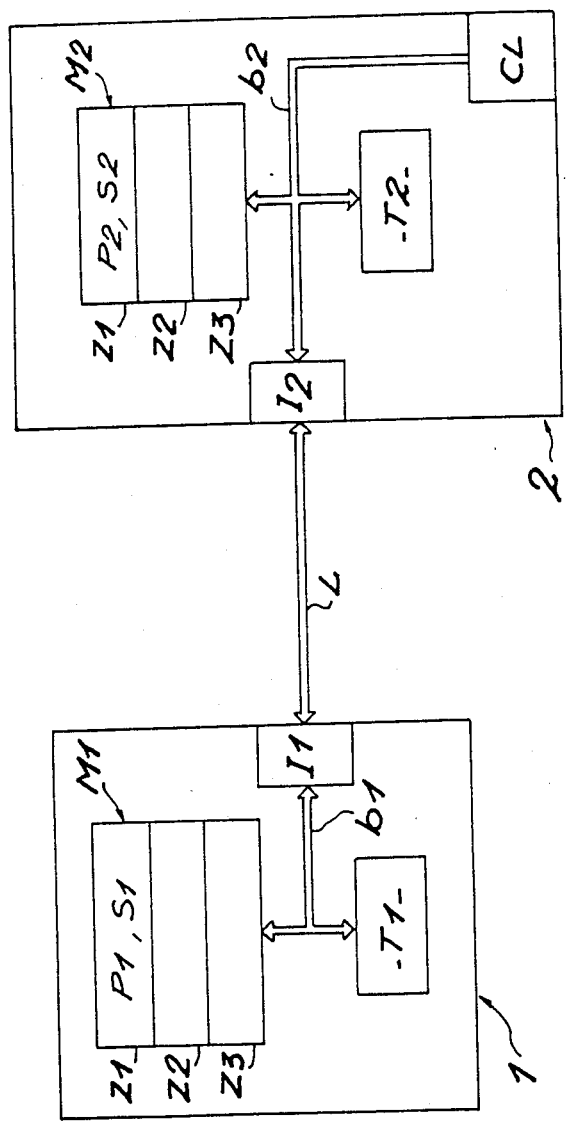

METHOD FOR CERTIFYING THE AUTHENTICITY OF A DATUM EXCHANGED BETWEEN TWO DEVICES CONNECTED LOCALLY OR REMOTELY BY A TRANSMISSION LINE

The invention relates to a method for certifying the authenticity of a datum exchanged between two devices locally or remotely by a transmission line, in which each device includes at least one memory and processing circuits.

The invention is applicable in particular to memory cards remotely coupled with an external device for certifying, via the card, the authenticity of a datum transmitted by the external device or for certifying, via the external device, the authenticity of a datum transmitted by the card.

The majority of applications using memory cards use standard operations for writing and reading data in the memory on the card. The validity of these operations assumes the authenticity of the data exchanged between the card and the external device; that is, it is assumed that a datum received is indeed identical to the datum transmitted. This authenticity is not guaranteed, when the card the external device are connected remotely via a standard transmission route susceptible to observation by a defrauder capable of modifying the data in the course of transmission. This problem is a major one, especially in banking applications where the data exchanged relate to credits or debits of sums of money.

One solution to this problem may comprise enciphering the data to be transmitted, but this solution is not entirely satisfactory. In effect, the receiver deciphers the datum, in order to obtain a datum in the clear, but it is not certain that this datum does indeed correspond to the one transmitted.

The invention overcomes this disadvantage and makes it possible to authenticate a datum received as being not merely identical to the datum transmitted, but also as having been transmitted by an authorized transmitting device. Thus the invention makes it possible to detect both a datum that has been modified in the course of its transmission and a datum transmitted from an transmitter device that is not authorized.

The invention accordingly proposes a method for certifying the authenticity of a datum exchanged between two transmitter and receiver devices connected by a standard transmission route, each device including at least one memory and processing circuits, characterized in that it comprises, in the transmitter device (2), fashioning an enciphered message (M) by application of the enciphering function (f2) of a nonsingular algorithm implemented by a program (P2) executed by the processing circuits (T2) and such that:

$$M = f2(S2, X)$$

where (S2) is the enciphering key of the algorithm prerecorded in the memory (M2) of the transmitter device (2) and (X) is a parameter organized into at least one field (X1) satisfying a predetermined condition and one field (X2) representative of the value (v) of the daum (d), transmitting this message (M) to the receiving device (1), deciphering this message (M) by application of the deciphering function (f1) of said algorithm to obtain a parameter (X') such that:

$$X' = f1(M, S1)$$

where (S1) is the deciphering key prerecorded in the memory (M1) of the receiving device (1), organizing the parameter (X') into at least one field (X'1) and one field (X'2), and verifying that the field (X'1) verifies the same predetermined condition as the field (X1) of the parameter (X) so as to deduce from this that the value of the datum of the field (X'2) is equal to the value of the datum (d) of the field (X2).

One advantage of the invention is that information can be written at a distance and in complete security in a receiving device, in particular comprising a portable object such as a credit card.

Further advantages, characteristics and details will become apparent from the ensuing description, referring to the accompanying drawing, which is given by way of example and schematically shows the principal elements or circuits with which the method according to the invention can be performed.

Referring to the drawing, two electronic devices (1, 2) are connected locally or at a distance by a standard transmission route (L) which is electrical or optical.

The device (1) includes at least one memory (M1), processing circuits (T1) and an input/output interface (I1). All these circuits are connected with on another via a connecting bus (b1).

The device (2) includes at least one memory (M2), processing circuits (T2), one data input device such as a keyboard (CL) and one input/output interface (I2). All these circuits are connected with one another by a connecting bus (b2). The memories (M1, M2) are for example divided into at least two memory zones (Z1, Z2). Once they have been recorded, the data in the memory zones (Z1) are locked to make them inaccessible for reading and writing from the outside. Once they have been recorded, the data in the memory zones (Z2) are accessible only for reading from the outside. Contrarily, all the data recorded in the memory zones (Z1, Z2) are internally freely accessible by the processing circuits. The memories (M1, M2) generally also include a working zone (Z3) for the intermediate storage and data in the course of the operations performed by the processing circuits.

By way of example, the device (1) comprises a portable object such as a card, while the device (2) is representative of an external device capable of dialogue with a card temporarily coupled to this external device. The dialogue that is established between the card and the device normally makes it possible to obtain the furnishing of a service or an authorization of access by the intermediary of complementary circuits, not shown, the nature of which depends on the particular application intended.

Any dialogue necessarily involves an exchange of data, and it will be assumed here that the external device (2) is arranged for transmission of a datum (d) to the card (1).

A first security measure comprises not transmitting in the clear the datum (d) that is to be enciphered prior to transmission such as to make the card (1) capable of certifying that the deciphered datum is indeed identical to the datum (d) transmitted.

The datum (d) may be a datum resulting from a calculation performed by the processing circuits (T2) of the external device (2) or a datum input at the keyboard (CL) of the external device (2) and possibly pre-processed by the processing circuits (T2).

The enciphering of the datum (d) is obtained by a program (P2) prerecorded in the memory zone (Z1) of the memory (M2) and executed by the processing circuits (T2). This program (P2) is the implementation of a function (f2) for enciphering a nonsingular algorithm. This function (f2) takes into account at least one enciphering key (S2) prerecorded in the memory zone (Z1) of the memory (M2) and a parameter (X) which is associated with the datum (d).

More precisely, the parameter (X) is organized into a plurality of fields (X1, X2, ..., Xn) with at least one of these fields which must satisfy a predetermined equation and at least one field which is representative of the value (v) or binary configuration of the datum (d).

By way of example, the parameter (X) includes three fields (X1, X2, X3) in which:

$$X1 = X2 = ad(d)$$

$$X3 = v$$

where ad(d) is the address in memory of the card (1) where the datum (d) must be recorded, and (v) is the value of the datum (d).

Thus an enciphered message (M) is obtained, such as: $M = f2(X, S2)$.

This message (M) is transmitted to the card (1) by the transmission route (L). The processing circuits (T1) of the card (1) will execute a program (p1), prerecorded in the memory zone (Z1) of the memory (M1), on the message (M) received. This program (P1) is the implementation of the inverse function (f1) or deciphering function of the nonsingular algorithm used at the time of the operation of encipherment by the external carrier (2). The program (P1) deciphers the message (M) by means of a deciphering key (S1) prerecorded in the memory zone (Z1) of the memory (M1), such as:

$$f1(M, S1) = X'.$$

Like the parameter (X), the parameter (X') thus obtained is organized into a plurality of fields (X'1, X'2, ..., X'n), and the conditions or equations that are satisfied by the fields of the parameter (X) must also be satisfied by the corresponding fields of the parameter (X'). Taking the foregoing example, the parameter (X') is organized into three fields (X'1, X'2, X'3).

According to the invention, if the fields (X'1, X'2) satisfy the same equation as the fields (X1, X2), that is, that the data of these fields are identical and equal to the address (ad) of the datum (d), the card considers that the field (X'3) does indeed represent the value (v) of the datum (d) transmitted by the external carrier (2).

The card (1), by the intermediary of its processing circuits (T1), can now proceed to writing the datum (d) at the address (ad) of the memory zone (Z2) or (Z3) of the memory (M1) of the card (1).

In the contrary case, the card (1) considers that the value (v) of the datum of the field (X'3) of the parameter (X') is not equal to the value (v) of the datum (d) transmitted. Under these conditions, the card (1) does not take into account the message (M) received, knowing that one of the following has taken place:
either an error in the transmission of the message (M),
or a modification of the message (M) in the course of its transmission,
or the message (M) was not transmitted by an authorized transmitting device, if the enciphering key (S2) does not correspond to the deciphering key (S1) of the card (1), which is assumed to be a valid card.

To increase security in the transmission of the datum (d), the enciphering program (P2) can also take into account a random number (E). Thus the same datum (d) will be enciphered differently, to prevent a defrauder from being able to re-use an earlier message (M).

The random number (E) is furnished by the card itself. More precisely, this number is sampled in the memory zone (Z2), or control zone, of which at least one bit is modified after each use of the card (1). Accordingly the random number comprises the word of the memory zone (Z1) that contains the last bit modified. Naturally this number (E) is transmitted to the external carrier (2) prior to the enciphering operation.

As a variant, the random number (E) can comprise the initial contents of the word located at the address (ad) of the memory where writing is desired to be done. Since the writing of a datum into memory is done word by word, the writing of a datum (d) of a plurality of words will necessitate transmission word by word by the method of the invention, with a different random number (E) each time, comprising the contents of the word at the address (ad) which is successively modified, until the writing of the datum (d) is complete.

It will be understood that the invention applies in reverse order when the external device (2) is to certify a datum (d) transmitted by the card (1).

The enciphering program (P2) and the deciphering program (P1) that are mentioned above may be identical, which means that the keys (S1) and (S2) are likewise identical. As a security measure, these keys must remain secret and it is for this reason that they are prerecorded in the memory zones (Z1) that are inaccessible from outside.

As a variant, the above-mentioned algorithm may be an algorithm with a public key, known per se.

I claim:

1. A method for certifying the authenticity of a datum exchanged between two transmitter and receiver devices connected by a standard transmission route, each device including at least one memory and processing circuits, characterized in that it comprises, in the transmitter device (2), fashioning an enciphered message (M) by application of the enciphering function (f2) of a nonsingular algorithm implemented by a program (P2) executed by the processing circuits (T2) and such that:

$$M = f2(S2, X)$$

where (S2) is the enciphering key of the algorithm prerecorded in the memory (M2) of the transmitter device (2) and (X) is a parameter organized into at least one field (X1) satisfying a predetermined condition and one field (X2) representative of the value (v) of the datum (d), transmitting this message (M) to the receiving device (1), deciphering this message (M) by application of the deciphering function (f1) of said algorithm to obtain a parameter (X') such that:

$$X' = f1(M, S1)$$

where (S1) is the deciphering key prerecorded in the memory (M1) of the receiving device (1), organizing the parameter (X') into at least one field (X'1) and one field (X'2), and verifying that the field (X'1) verifies the same predetermined condition as the field (X1) of the parameter (X) so as to deduce from this that the value of the datum of the field (X'2) is equal to the value of the datum (d) of the field (X2).

2. A method according to claim 1, characterized in that it comprises causing the functions (f1, f2) to take into account a random number (E).

3. A method according to claim 2, characterized in that it comprises, when the transmitting device (2) or the receiving device (1) is a portable object, causing the random number (E) to be managed by the portable device by putting it into a monitoring memory zone (Z2) the contents of which are modified each time the portable object is used.

4. A method according to claim 1, characterized in that it comprises defining the aforementioned predetermined condition that the field (X1) of the parameter (X) must satisfy, beginning at the memory address (ad) at which the datum (d) must be written.

5. A method according to claim 2, characterized in that it comprises defining the aforementioned predetermined satisfy, beginning at the memory address (ad) at which the datum (d) must be written.

6. A method according to claim 3, characterized in that is comprises defining the aforementioned predetermined condition that the field (X1) of the parameter (X) must satisfy, beginning at the memory address (ad) at which time the datum (d) must be written.

* * * * *

UNITED STATES PATENT AND TRADEMARK OFFICE
CERTIFICATE OF CORRECTION

PATENT NO. : 4,907,270

DATED : March 6, 1990

INVENTOR(S) : Hazard, Michel

It is certified that error appears in the above-identified patent and that said Letters Patent is hereby corrected as shown below:

Col. 6, line 10, (line 3 of claims ), before "satisfy" insert -- condition that the field (X1) of the parameter (X) must --.

Col. 6, line 16, (line 5 of claim 6) after "which", delete "time".

Signed and Sealed this

Tenth Day of September, 1991

Attest:

Attesting Officer

HARRY F. MANBECK, JR.

Commissioner of Patents and Trademarks